United States Patent [19]
Ito

[11] Patent Number: 5,887,101
[45] Date of Patent: Mar. 23, 1999

[54] PACKAGE FOR OPTICAL MODULE

[75] Inventor: Akishige Ito, Tokyo, Japan

[73] Assignee: Ando Electric Co., Ltd., Tokyo, Japan

[21] Appl. No.: 953,212

[22] Filed: Oct. 17, 1997

[30] Foreign Application Priority Data

Oct. 18, 1996 [JP] Japan .................................. 8-297431

[51] Int. Cl.⁶ .................................................. G02B 6/255
[52] U.S. Cl. ............................................................. 385/92
[58] Field of Search .................................. 385/37, 33, 38, 385/49, 52, 91, 90, 92, 93, 88, 89, 94; 359/34

[56] References Cited

U.S. PATENT DOCUMENTS

| | | | |
|---|---|---|---|
| 4,955,684 | 9/1990 | Shiga | 385/39 |
| 5,475,783 | 12/1995 | Go et al. | 385/92 |
| 5,515,462 | 5/1996 | Huang et al. | 385/37 |
| 5,596,665 | 1/1997 | Kurashima et al. | 385/92 |
| 5,737,467 | 4/1998 | Kato et al. | 385/92 |
| 5,742,480 | 4/1998 | Sawada et al. | 385/89 |
| 5,790,504 | 8/1998 | Hayashi et al. | 369/112 |

Primary Examiner—Akm E. Ullah
Attorney, Agent, or Firm—Flynn, Thiel, Boutell & Tanis, P.C.

[57] ABSTRACT

A package for an optical module, having such a strong construction as to be able to prevent occurrence of warping due to a stress acting thereon, and capable of restraining displacement of an optical fiber fixedly attached to a pipe, and displacement of optical components mounted on a bottom plate so that misalignment of the optical axis is prevented. The package for the optical module is provided with the bottom plate with the optical components mounted thereon, a package frame having the shape of a cylinder, fixedly mounted on the bottom plate, and disposed around the periphery of a mount for the optical components, a pipe fixedly attached to the package frame, and cutting through a predetermined region of the external circumferential surface of the package frame such that one of the extremities of the pipe is projected outwardly, and the optical fiber fixedly attached to the projected extremity of the pipe, thickness of the bottom plate being increased in a region along the internal circumferential surface of the package frame except the mount for the optical components.

2 Claims, 1 Drawing Sheet

PACKAGE FOR OPTICAL MODULE

BACKGROUND OF THE INVENTION

1. Field of the Invention

The present invention relates to a package for an optical module for coupling a light emitting element, for example, a laser or the like with an optical fiber.

2. Description of the Related Art

A conventional package of this type, having a construction as shown in FIG. 2, is well known. FIG. 2 is a view showing a sectional structure of the conventional package for an optical module.

Referring to FIG. 2, reference numeral 1 is a package frame, 2 a bottom plate, and 3 a pipe fixedly attached to the package frame 1 passing through a predetermined region thereof A plate about 1 mm in thickness is normally used for the bottom plate 2 of the conventional package for the optical module. For the package frame 1, a frame in a square cylinder-like form about 1 mm in wall thickness on four sides is used.

In manufacturing the optical module by use of the package described above, a light emitting element 4 and a lens 5 for condensing light rays are mounted on a substrate 7 inside the package, and a single mode optical fiber 6 is fixedly attached to the extremity of the pipe 3.

In the optical module shown in FIG. 2, rays of light emitted from the light emitting element 4 are condensed by the lens 5, and coupled with the single mode optical fiber 6. Coupling of outgoing rays of light from the light emitting element 4 with the single mode optical fiber 6 is highly sensitive such that deviation of the single mode optical fiber 6 by mere several μm causes deterioration in the coupling of the rays of light to a great extent. Deviation of the light emitting element 4 by about several μm instead of the single mode optical fiber 6 also causes extreme deterioration in the coupling of the rays of light.

The package for the optical module shown in FIG. 2 has a drawback that it is vulnerable to a stress, and susceptible to various types of warps because it is provided with the package frame 1 in the order of several μm in thickness, and only the lower edge of the package frame is securely attached to the bottom plate 2 having even thickness. As a result, the conventional package for the optical module has structural problems as described hereafter.

Firstly, the pipe 3 is fixedly attached to the package frame 1, and the single mode optical fiber 6 is fixedly attached to the pipe 3. As a result, warping of the package frame 1 causes the pipe 3 to be tilted, which in turn displaces the single mode optical fiber 6 from its optimum position, creating a cause for misalignment of the optical axis.

In particular, when fixedly attaching the single mode optical fiber 1 to the pipe 3, a large stress acts on the pipe 3 to hold it in place. The stress causes the package frame 1 to be warped. In such a case, the single mode fiber 6 securely fixed to the package frame 1 in a state as warped is consequently, displaced from the optimum position by the agency of reaction force to cause the package frame 1 to restore its original position. This is another cause for misalignment of the optical axis.

Furthermore, for securely mounting the package for the optical module on the surface of a fixture mount, flanges of the bottom plate 2 are fixedly attached thereto by screws. Accordingly, any warp of the surface of the fixture mount causes the bottom plate 2 to be warped, resulting in displacement of the light emitting element 4 (one of optical components). This is yet another cause for misalignment of the optical axis. In addition, warping of the bottom plate 2 causes also the package frame 1 to be warped.

As described in the foregoing, in the case of the conventional package for the optical module, intrinsic structural problems, that is, displacement of the optical components due to warping of the bottom plate and displacement of the pipe due to warping of the package frame create a direct cause for misalignment of the optical axis. In view of misalignment of the optical axis occurring due to warping of the package for the optical module as described above, it is necessary to reinforce the package for the optical module to prevent warping from occurring thereto even when a stress acts thereon.

SUMMARY OF THE INVENTION

It is therefore an object of the invention to provide a package for an optical module, having a stout structure so as not to be warped due to a stress acting thereon, and capable of preventing misalignment of the optical axis by restraining displacement of a single mode optical fiber fixedly attached to a pipe, and displacement of optical components mounted on a bottom plate so that problems described in the foregoing are solved.

In order to achieve the object described, the package for the optical module comprises a bottom plate 8 with optical components 4, 5, and 6, mounted thereon, a package frame 1 having the shape of a cylinder, fixedly mounted on the bottom plate 8, and disposed around the periphery of a mount for the optical components, a pipe 3 fixedly attached to the package frame 1, and cutting through a predetermined region of the external circumferential surface of the package frame 1 such that one of the extremities of the pipe 3 is projected outwardly, and an optical fiber 6 fixedly attached to the projected extremity of the pipe 3, thickness of the bottom plate 8 being increased in a region along the internal circumferential surface of the package frame 1 except the mount for the optical components.

The thickness of the bottom plate 8 in a region along the external circumferential surface of the package frame 1 may also be increased.

DESCRIPTION OF THE PREFERRED EMBODIMENTS

Figure 1:
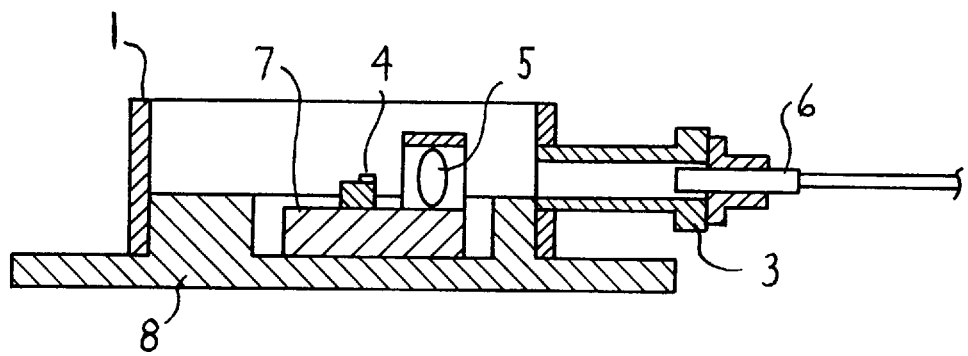
FIG. 1 is a sectional view of a package for an optical module according to an embodiment of the invention.
Figure 2:
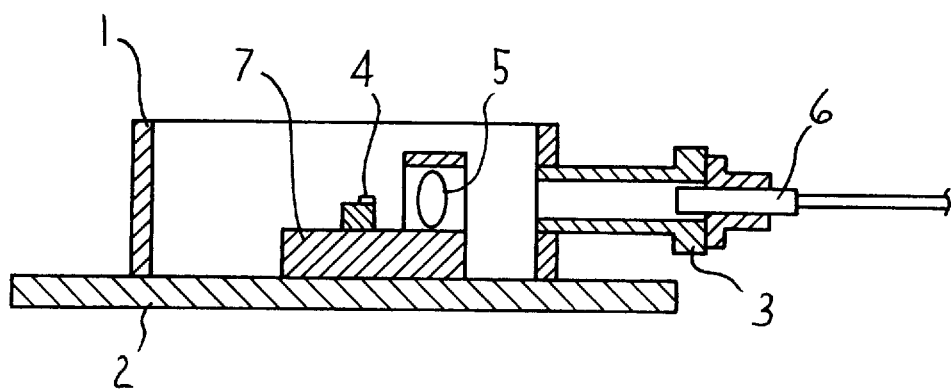
FIG. 2 is a sectional view of a conventional package for an optical module.

Referring to FIG. 1, an embodiment of the invention is described in detail hereafter. In FIG. 1, parts identical to those previously described with reference to FIG. 2 are denoted by the same reference numerals, and duplicate description thereof is omitted herein.

FIG. 1 is a view showing the constitution of a package for an optical module according to the embodiment of the invention. As is apparent in comparison with FIG. 2, the package for the optical module according to the embodiment is characterized in that the thickness of a bottom plate 8 is increased in a region along the internal surface of sidewalls of a package frame 1 except a region for a substrate 7 on which optical components are mounted. However, the thickness of the bottom plate 8 between a lens 5 and a pipe 3 is not to interfere with a space corresponding to the inside diameter of the pipe 3.

With a structure as described above, the strength of the bottom plate 8 is reinforced, rendering the bottom plate 8 unsusceptible to warping. Also, the package frame 1 squeezed between thicker portions of the bottom plate 8 is rendered unsusceptible to warping. Consequently, the package can be reinforced without increasing the dimensions of the optical module.

Particularly, the bottom plate 8 with the thickness thereof being increased within a region surrounded by the package frame 1, except a mount for optical components, is rendered unsusceptible to warping such as bending and twisting, eliminating the likelihood of the optical components being displaced and the package frame 1 being warped.

With the package structured such that a single mode optical fiber 6 is fixedly attached to the pipe 3, a stress acts on the pipe 3, and also on the package frame 1 when attaching the single mode optical fiber 6 to the pipe 3. However, as the package frame 1 too is structured in such a way as to be highly resistant to a stress owing to the shape of the bottom plate, misalignment of the optical axis caused by warping of the package frame 1 can be prevented.

Furthermore, when fixedly mounting the optical module on the surface of a fixture mount, any warping caused by the condition of the surface of the fixture mount is not conveyed to the bottom plate 8, and as a result, misalignment of the optical axis does not occur, enabling stable output of light.

The present invention is not to be limited to the structure of the embodiment according to the invention. For example, the package is further reinforced by increasing the thickness of the bottom plate 8 such that an outside sidewall is formed by the thickness increased on the outside of the package frame 1 as well. Further, misalignment of the optical axis is held down to a minimum by increasing the thickness in such a way as to prop up the pipe 3.

Thus, the invention can provide the package for the optical module, having such a strong construction as to be able to prevent occurrence of warping due to a stress acting thereon, and capable of restraining displacement of the single mode optical fiber fixedly attached to the pipe, and displacement of the optical components mounted on the bottom plate so that misalignment of the optical axis is prevented.

What is claimed is:

1. A package for an optical module comprising a bottom plate with optical components mounted thereon, a package frame having the shape of a cylinder, fixedly mounted on the bottom plate, and disposed around the periphery of a mount for the optical components, a pipe fixedly attached to the package frame, and cutting through a predetermined region of the external circumferential surface of the package frame such that one of the extremities of the pipe is projected outwardly, and an optical fiber fixedly attached to the projected extremity of the pipe, thickness of the bottom plate being increased in a region along the internal circumferential surface of the package frame except the mount for the optical components.

2. A package for an optical module according to claim 1 wherein thickness of the bottom plate is increased in a region along the external circumferential surface of the package frame as well.

* * * * *